US008854692B2

(12) United States Patent  (10) Patent No.: US 8,854,692 B2
Maeno  (45) Date of Patent: *Oct. 7, 2014

(54) PRINTING DEVICE AND PRINTING METHOD GENERATING WATERMARK INFORMATION

(71) Applicant: Oki Data Corporation, Tokyo (JP)

(72) Inventor: Kurato Maeno, Saitama (JP)

(73) Assignee: Oki Data Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/644,806

(22) Filed: Oct. 4, 2012

(65) Prior Publication Data

US 2013/0027754 A1   Jan. 31, 2013

Related U.S. Application Data

(63) Continuation of application No. 11/585,094, filed on Oct. 24, 2006, now Pat. No. 8,305,647.

(30) Foreign Application Priority Data

Nov. 2, 2005  (JP) ................................. 2005-318999

(51) Int. Cl.
   *H04N 1/40*     (2006.01)
   *H04N 1/32*     (2006.01)
   *H04N 1/44*     (2006.01)

(52) U.S. Cl.
   CPC .... *H04N 1/32144* (2013.01); *H04N 2201/3205* (2013.01); *H04N 1/4433* (2013.01); *H04N 1/4413* (2013.01)
   USPC ........... 358/3.28; 358/1.1; 358/1.9; 358/1.15; 713/176; 713/168; 713/150; 382/100

(58) Field of Classification Search
   USPC ............ 358/3.28, 1.1, 1.9; 382/100; 713/176, 713/168, 150; 283/13
   See application file for complete search history.

(56) References Cited

U.S. PATENT DOCUMENTS 5,671,277 A * 9/1997 Ikenoue et al. ............... 713/179
5,987,127 A * 11/1999 Ikenoue et al. ............... 358/401
6,378,070 B1 * 4/2002 Chan et al. .................... 713/155
6,738,491 B1   5/2004 Ikenoue et al.

(Continued)

FOREIGN PATENT DOCUMENTS

JP   06-022119 A    1/1994
JP   2001-320517 A  11/2001

(Continued)

*Primary Examiner* — Benny Q Tieu
*Assistant Examiner* — Martin Mushambo
(74) *Attorney, Agent, or Firm* — Rabin & Berdo, P.C.

(57) ABSTRACT

The present invention provides an information printing method and a printing device, which assure a higher level of security when outputting printed matter. The present invention provides a printing device comprising a document storage means for storing electronic document data generated at a printing instruction issuing terminal operated by a printing instruction issuer and transmitted from the printing instruction issuing terminal, an ID setting means for setting a print retriever ID of a print retriever who is to execute processing for outputting the electronic document data stored at the document storage means onto paper, a watermark information superimposing means for superimposing the print retriever ID having been set at the ID setting means as watermark information onto the electronic document data and a printing means for outputting the electronic document data having the watermark information superimposed thereupon by the watermark information superimposing means onto paper.

15 Claims, 6 Drawing Sheets

(56) References Cited

U.S. PATENT DOCUMENTS

| | | |
|---|---|---|
| 7,039,215 B2 * | 5/2006 | Suzaki .................... 382/100 |
| 7,085,399 B2 * | 8/2006 | Suzaki .................... 382/100 |
| 2001/0007130 A1 * | 7/2001 | Takaragi ................. 713/186 |
| 2002/0114001 A1 * | 8/2002 | Oyanagi ................. 358/1.15 |
| 2002/0135810 A1 * | 9/2002 | Ikenoue et al. ......... 358/3.28 |
| 2004/0105571 A1 * | 6/2004 | Ikenoue et al. ......... 382/100 |
| 2004/0199771 A1 * | 10/2004 | Morten et al. ........... 713/176 |
| 2005/0111867 A1 * | 5/2005 | Hatano ..................... 399/80 |
| 2006/0072782 A1 | 4/2006 | Abe et al. |
| 2007/0091376 A1 | 4/2007 | Calhoon et al. |
| 2007/0195992 A1 | 8/2007 | Ikenoue et al. |

FOREIGN PATENT DOCUMENTS

| | | |
|---|---|---|
| JP | 2002-127545 A | 5/2002 |
| JP | 2003-101762 | 4/2003 |
| JP | 3628312 | 4/2003 |
| JP | 2003-291462 A | 10/2003 |
| JP | 2004-357017 A | 12/2004 |
| JP | 2005-109990 A | 4/2005 |
| JP | 2005-149324 A | 6/2005 |
| JP | 2005-259012 A | 9/2005 |
| JP | 2005-262825 A | 9/2005 |
| WO | WO-00/51338 A1 | 8/2000 |

* cited by examiner

PRINTING DEVICE AND PRINTING METHOD GENERATING WATERMARK INFORMATION

CROSS REFERENCE TO RELATED APPLICATIONS

This application is a continuation of U.S. application Ser. No. 11/585,094, which was filed on Oct. 24, 2006 and allowed on Jul. 5, 2012, and which claims priority from Japanese Patent Application No. JP 2005-318999, filed on Nov. 2, 2005, the disclosure of which, including the specification, drawings and abstract, is incorporated herein by reference in its entirety

BACKGROUND OF THE INVENTION

The present invention relates to a printing method and a printing device.

Information leakage via important printed documents such as confidential communications having been printed on a printing device such as a printer, which is left untended and ends up in the hands of a third-party, has been occurring with increasing frequency. The problem is exacerbated by the difficulty in identifying the source of the leaked printed matter on which information enabling identification of the person who has printed out the document is not superimposed in an indelible format.

The problem is addressed in the invention disclosed in Japanese Laid Open Patent Publication No. 2003-101762 related to a printing method and a printing device achieved by adopting a technology whereby watermark information is superimposed on electronic document data so as to print out the electronic document data by automatically superimposing information indicating the printing party, the printing date or the like (see Japanese Laid Open Patent Publication No. 2003-101762).

However, even the method disclosed in Japanese Laid Open Patent Publication No. 2003-101762 does not provide a complete solution to the problem. Namely, if the terminal at which the printing party issues a printing instruction is located over a considerable distance from the printing device on which the printed matter is output, a third-party may take away the printed matter output on paper before the printing party having issued the printing instruction reaches the printing device. Under such circumstances, it will be difficult to track the printed matter.

SUMMARY OF THE INVENTION

Accordingly, an object of the present invention, which has been completed by addressing the problems of the related art discussed above, is to provide an information printing method and a printing device that assure a high level of security when outputting printed matter on a printing device by superimposing information indicating the printed matter outputting party over the electronic document data.

The object described above is achieved in an aspect of the present invention by providing a printing device that prints out electronic document data by superimposing watermark information over the electronic document data, comprising a document storage means for storing electronic document data generated at a printing instruction issuing terminal operated by a printing instruction issuer who has issued an instruction for printing an electronic document and transmitted from the printing instruction issuing terminal, an ID setting means for setting a print retriever ID of a print retriever who is to engage the printing device in processing for outputting the electronic document data stored at the document storage means onto paper as printed matter, a watermark information superimposing means for superimposing the print retriever ID having been set at the ID setting means as watermark information onto the electronic document data stored at the document storage means and a printing means for outputting the electronic document data having the watermark information superimposed thereupon by the watermark information superimposing means onto paper as printed matter.

In the printing device adopting the structure described above, the document storage means stores the electronic document data generated at the printing instruction issuing terminal, the ID setting means sets the print retriever ID indicating the print retriever to execute the processing for outputting the electronic document data as printed matter onto paper, the watermark information superimposing means superimposes the information indicating the print retriever ID as watermark information onto the electronic document data and the printing means outputs the electronic document data having superimposed thereupon the watermark information onto paper as printed matter. In other words, information indicating the person who has actually output the printed matter on the printing device can be superimposed as watermark information onto the printed matter by employing the printing device achieved in the first aspect of the present invention.

The ID setting means may wait in standby without setting the print retriever ID until after the electronic document data are transmitted from the printing instruction issuing terminal and the electronic document data are stored into the document storage means and, accordingly, the watermark information superimposing means may superimpose watermark information indicating the print retriever ID over the electronic document data only after the ID setting means sets the print retriever ID. In other words, the ID setting means may enter a state in which the print retriever ID is set only after the electronic document data are stored into the document storage means and only then the watermark information superimposing means may superimpose watermark information indicating that print retriever ID having been set by the ID setting means. In this case, since the ID setting means sets the print retriever ID after the print processing is executed at the printing instruction issuing terminal, the printed matter can be output with an even higher level of security.

The printing device may further comprise a document selection means for selecting the electronic document data to be output as printed matter onto paper among sets of electronic document data stored at the document storage means. The watermark information superimposing means in such a printing device may superimpose the watermark information indicating the print retriever ID set via the ID setting means over the electronic document data having been selected by the document selection means. In the printing device, the document selection means selects the electronic document data to be output from the sets of electronic document data stored at the document storage means and the watermark information indicating the print retriever ID set via the ID setting means is superimposed over the selected electronic document data. This structure allows a plurality of sets of electronic document data to be stored at the document storage means.

The document storage means may further store authorization information indicating paper output authorization in a format that correlates the authorization information to the electronic document data. In this printing device, only after the ID setting means sets the print retriever ID, can the document selection means make a decision as to whether or not the person corresponding to the print retriever ID is authorized to output the electronic document data onto paper as printed matter, and only after the person corresponding to the print retriever ID is judged to be authorized to output the electronic document data onto paper as printed matter, can the watermark information superimposing means superimpose the print retriever ID as a watermark over the electronic document data. In this case, only when the person corresponding to the print retriever ID is authorized to retrieve the printed matter, the print retriever ID is superimposed on the electronic document data as a watermark. As a result, unless the person corresponding to the print retriever ID is authorized to retrieve the printed matter, the electronic document data output cannot be extracted from the printing device. Alternatively, if the person corresponding to the print retriever ID is not authorized to output the electronic document data onto paper as printed matter, the electronic document data may be destroyed.

The authorization for paper output indicated in the authorization information may be an attribute included therein that matches an attribute of the print retriever ID. In this case, only if the authorization information indicating the paper output authorization includes an attribute of the print retriever ID, the print retriever ID is superimposed over the electronic document data as a watermark. As a result, unless the authorization information indicating the paper output authorization includes an attribute of the print retriever ID, the electronic document data cannot be extracted from the printing device.

The authorization for paper output indicated in the authorization information may be an ID included therein that matches the print retriever ID. In this case, if the authorization information indicating the paper output authorization includes an ID matching the print retriever ID, the print retriever ID can be superimposed on the electronic document data as a watermark. In other words, unless the authorization information indicating paper output authorization includes an ID matching the print retriever ID, the electronic document data cannot be extracted from the printing device.

The watermark information superimposing means may further superimpose over the electronic document data watermark information indicating at least one of; the date/time at which the printing instruction is issued by the printing instruction issuer, the name of the printing instruction issuer, the document title assigned to the electronic document data, the terminal name of the printing instruction issuing terminal, and the IP address of the printing instruction issuing terminal or information enabling identification of the printing device. The information that enables identification of the printing device may be the serial number assigned to the printing device or an ID designated to the printing device. The watermark information superimposing means adopting this structure superimposes information used to identify the electronic document data or the printing device as watermark information in addition to the print retriever ID set via the ID setting means. As a result, since information that enables identification of the electronic document data or the printing device is superimposed as watermark information onto the printed matter, it is possible to later ascertain the specific date/time and the specific location at which the electronic document data were output, in addition to the specific person that executed the output processing.

If the ID setting means does not set the print retriever ID within a predetermined length of time, the electronic document data stored at the document storage means may be discarded. In this case, if the print retriever ID is not set within the predetermined length of time after the electronic document data are transmitted from the printing instruction issuing terminal to the printing device, the electronic document data stored at the document storage means are discarded. As a result, since the electronic document data are not stored at the document storage means over an indeterminate length of time, the confidential document is handled with a high level of security.

The ID setting means may be a card reader. Such an ID setting means sets the print retriever ID by reading an ID card via the card reader. In other words, the print retriever ID can be set by using an ID card.

The ID setting means may instead be constituted with a biometric verification device. In this case, the ID setting means sets the print retriever ID via the biometric verification device. As a result, an unauthorized third-party cannot falsely claim to be authorized personnel.

The object described above is achieved in another aspect of the present invention by providing a watermark information superimposing device that superimposes watermark information on electronic document data in printing applications, comprising a document storage means for storing electronic document data generated at a printing instruction issuing terminal operated by a printing instruction issuer who has issued an instruction for printing an electronic document and transmitted from the printing instruction issuing terminal, an ID setting means for setting a print retriever ID of a print retriever who is to execute processing for outputting the electronic document data stored at the document storage means onto paper as printed matter and a watermark information superimposing means for superimposing the print retriever ID having been set at the ID setting means as watermark information onto the electronic document data. The watermark information superimposing device is characterized in that the ID setting means wait in standby without setting the print retriever ID until after the electronic document data are transmitted from the printing instruction issuing terminal and the electronic document data are stored into the document storage means and that the watermark information superimposing means superimposes the print retriever ID onto the electronic document data as watermark information only after the ID setting means sets the print retriever ID.

In the watermark information superimposing means adopting the structure described above, the document storage means stores the electronic document data generated at the printing instruction issuing terminal, the ID setting means sets the print retriever ID indicating the print retriever to execute the processing for outputting the electronic document data as printed matter onto paper and the watermark information superimposing means superimposes information indicating the print retriever ID as watermark information onto the electronic document data. In other words, information indicating the person who has actually attempted to output the electronic document data via the printing device can be superimposed as watermark information onto the printed matter by employing the watermark information superimposing device achieved in the second aspect of the present invention.

The object described above is further achieved in yet another aspect of the present invention by providing a printing method to be adopted in a printing device, comprising steps for storing electronic document data generated at a printing instruction issuing terminal operated by a printing instruction issuer having issued an instruction for printing out an electronic document, setting at the printing device a print retriever ID of a print retriever to retrieve the electronic document data from the printing device, superimposing the print retriever ID over the electronic document data as a watermark at the printing device only after the print retriever ID is set and outputting the electronic document data having superimposed thereupon the watermark onto paper as printed matter at the printing device.

The printing device adopting the printing method described above suspends print processing until after the print retriever ID is set and once the print retriever ID is set, the printing device superimposes the print retriever ID onto the electronic document data as watermark information and outputs the electronic document data onto paper as printed matter. Thus, the printing method adopted in the printing device, as achieved in the third aspect of the present invention, makes it possible to obtain from the printed matter information indicating the print retriever who has actually output the electronic document data through the printing device.

The object described above is also achieved in a still further aspect of the present invention by providing a printing method to be adopted in a printing device, comprising steps for storing electronic document data generated at a printing instruction issuing terminal operated by a printing instruction issuer who issues an instruction for printing out document data and containing a printing instruction issuer ID, setting at the printing device a print retriever ID indicating a print retriever to retrieve the electronic document data from the printing device, making a decision as to whether or not the person corresponding to the print retriever ID is authorized to retrieve the electronic document data from the printing device only after the print retriever ID is set, superimposing the print retriever ID onto the electronic document data as a watermark at the printing device only if the person corresponding to the print retriever ID is judged to be authorized to retrieve the electronic document data from the printing device and outputting the electronic document data having superimposed thereupon the watermark onto paper as printed matter at the printing device.

In this case, the printing device adopting the printing method suspends print processing until after the print retriever ID is set, and once the print retriever ID is set, the printing device superimposes the print retriever ID onto the electronic document data as watermark information and outputs the electronic document data onto paper as printed matter only if the person corresponding to the print retriever ID is judged to be authorized to retrieve the electronic document data from the printing device. Thus, the printing method adopted in the printing device, as achieved in the fourth aspect, ensures that the electronic data can be output as printed matter only if the print retriever is authorized to retrieve the electronic document data via the printing device and that information indicating the print retriever who has actually output the electronic document data on the printing device can be obtained as the watermark information superimposed on the printed matter.

The decision as to whether or not the person corresponding to the print retriever ID is authorized to retrieve the electronic document data from the printing device may be made by judging whether or not the printing instruction issuer ID and the print retriever ID match. In this case, only if the printing instruction issuer ID matches the print retriever ID, the electronic document data can be output as printed matter. Thus, the electronic document data can be output as printed matter only if the print retriever coincides with the printing instruction issuer having issued the instruction for printing out the document. In addition, information indicating that print retriever who has actually output the electronic document data via the printing device can be obtained as the watermark information superimposed over the printed matter.

The decision as to whether or not the person corresponding to the print retriever ID is actually authorized to retrieve the electronic document data from the printing device may be made by judging whether or not authorization information indicating authorization for paper output includes an attribute of the print retriever ID. In such a case, unless the authorization information indicating the paper output authorization includes an attribute of the print retriever ID, the electronic document data cannot be output as printed matter. As a result, the print retriever is able to output printed matter only if the print retriever ID includes the authorization information indicating the paper output authorization. Furthermore, the information indicating the print retriever who has actually output the electronic document data from the printing device can be obtained as the watermark information superimposed on the printed matter. In addition, the paper output authorization information may indicate a specific party indicated by the printing instruction issuer to be authorized to output the electronic document data on paper, or authorization information indicating viewing authorization, printing authorization or the like held in a database system where document data are stored may be used as the authorization information to allow only a party authorized in the database system to perform a printing operation to retrieve the printed matter.

The present invention provides an information printing method and a printing device that allow printed matter to be output with a higher level of security by superimposing information indicating a party having output the printed matter via a printing device onto electronic document data.

DETAILED DESCRIPTION OF THE PREFERRED EMBODIMENTS

Figure 1:
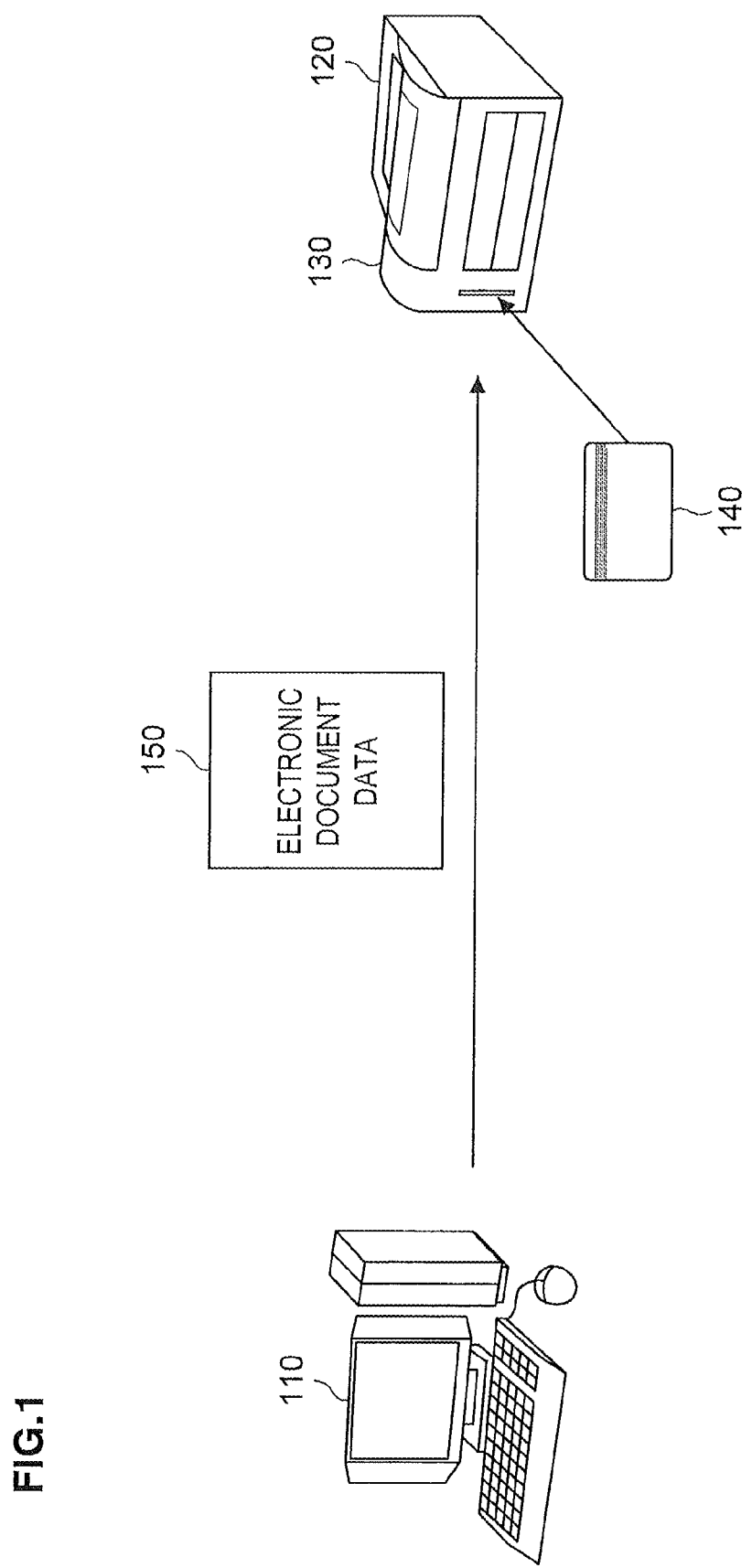
FIG. 1 shows the structure adopted in the first embodiment of the present invention.

The following is a detailed explanation of the preferred embodiments of the present invention, given in reference to the attached drawings. It is to be noted that in the specification and the drawings, the same reference numerals are assigned to components having substantially identical functions and structural features to preclude the necessity for a repeated explanation thereof.

First Embodiment

Figure 2:
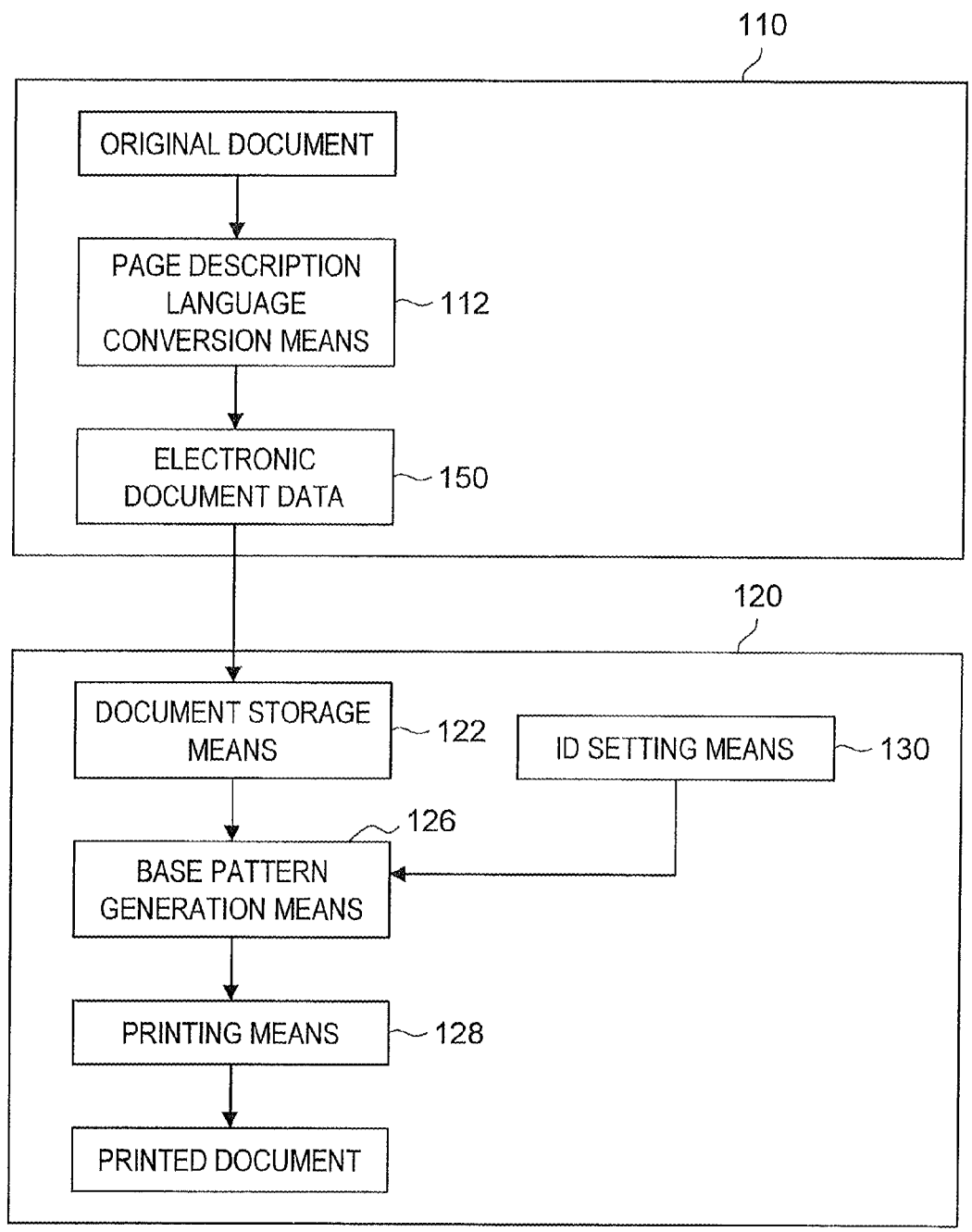
FIG. 2 is a block diagram of the first embodiment of the present invention.

FIGS. 1 and 2 provide diagrams in reference to which the printing device and the printing method achieved in the first embodiment of the present invention are explained. As shown in FIGS. 1 and 2, the printing method in the first embodiment of the present invention is implemented in conjunction with a printing instruction issuing terminal 110 and a printing device 120.

The printing instruction issuing terminal 110 includes a page description language conversion means 112. The page description language conversion means 112, which converts an original document created in a document creating program such as a word processing program or an editing program to electronic document data 150 adopting a page description language format that can be read by the printing device, is normally realized in the form of a software program such as a printer driver. While the existing page description languages include PostScript, HP-PCL and LIPS, any of these page description languages may be used in the embodiment.

The printing device 120 comprises a document storage means 122, a base pattern generation means 126 functioning as a watermark information superimposing means, a printing means 128 and an ID setting means 130.

At the document storage means 122, the electronic document data 150 having been generated at the printing instruction issuing terminal 110 are temporarily stored. The document storage means 122 may be constituted with a hard disk drive or a large-capacity memory. While the document storage means 122 in the embodiment is built into the printing device 120, the document storage means 122 according to the present invention does not need to be provided as a built-in unit in the printing device 120 and may instead be constituted with a hard disk drive or a large-capacity memory provided as an outside unit directly connected to the printing device 120 or connected to the printing device 120 via a network. In other words, the document storage means 122 may assume a mode such as a document server connected to the printing device 120.

The ID setting means 130 sets a print retriever ID indicating a print retriever to retrieve the electronic document data from the printing device 120 as printed matter containing the electronic document data printed out on paper. The print retriever ID is set in this embodiment by entering at the printing device information that enables identification of the print retriever. The ID setting means 130 may be constituted with a numeric keypad provided at the printing device, a card reader capable of reading an ID card of the print retriever, or a biometric verification device that biometrically verifies the print retriever. Either a contact-type card reader or a noncontact-type card reader may be used as the ID setting means. In addition, the ID setting means 130 may constitute an integrated part of the printing device or it may be an outside unit connected to the printing device. The ID setting means 130 provided as an outside unit may be connected to the printing device either through wired connection or through wireless connection. The ID setting means 130 in the embodiment is constituted with a magnetic card reader provided as an integrated part of the printing device 120. As a magnetic ID card 140 belonging to the print retriever is inserted at the magnetic card reader, the print retriever ID of the print retriever can be set.

The base pattern generation means 126 generates a base pattern based upon information indicating the print retriever ID set via the ID setting means 130, the printing time or the like and superimposes the base pattern as watermark information over the electronic document data. The data superimposed as the watermark information may include information used to identify the electronic document data, such as information indicating the document title of the electronic document data, the name of the printing instruction issuer, the name of the printing instruction issuing terminal or the IP address of the printing instruction issuing terminal, in addition to the information indicating the print retriever ID or the printing time. In addition, information that enables identification of the printing device 120, e.g., the serial number assigned to the printing device 120 or an ID pre-designated to the printing device 120, may be superimposed as the watermark information. While the base pattern generation means 126 is provided as a built-in unit in the printing device 120 in the embodiment, the base pattern generation means 126 according to the present invention may instead be provided as an outside unit directly connected to the printing device 120 or connected to the printing device 120 via a network.

The watermark information may be superimposed over the electronic document data by adopting the technology disclosed in Japanese Laid Open Patent Publication No. 2003-101762 whereby a base pattern is generated and is superimposed over electronic document data or by adopting a two-dimensional barcode technology. However, since a two-dimensional barcode can easily be removed by cutting it off from the printed matter on which it is printed or by painting over it, it is desirable to adopt the method disclosed in Japanese Laid Open Patent Publication No. 2003-101762 whereby the watermark information is superimposed on the electronic document data by generating a base pattern, i.e., by using the so-called Val-Code (registered trademark) so as to effectively prevent information leaks.

The base pattern generation method adopted in the embodiment is briefly explained. Information to be used as the watermark information is first converted to an N-dimensional code (N is a given integer). For instance, the printing instruction issuer ID may be converted to a two-dimensional code. Next, a watermark signal is assigned to each of the symbols constituting the coding language. A watermark signal expresses a wave with a given wavelength and given directionality through a dot array. Next, a watermark image to be used as the watermark information is generated by arranging a signal unit corresponding to the bit string of the coded data. The term "signal unit" in this context refers to a single signal unit assuming a rectangular shape having the width and the height of the watermark signal.

The printing means 128 outputs the electronic document data 150 having superimposed thereupon the base pattern to be used as the watermark information, which has been generated at the base pattern generation means 126, as printed matter onto paper. The electronic document data may be printed out onto the paper in a single color or in multiple colors.

Figure 3:
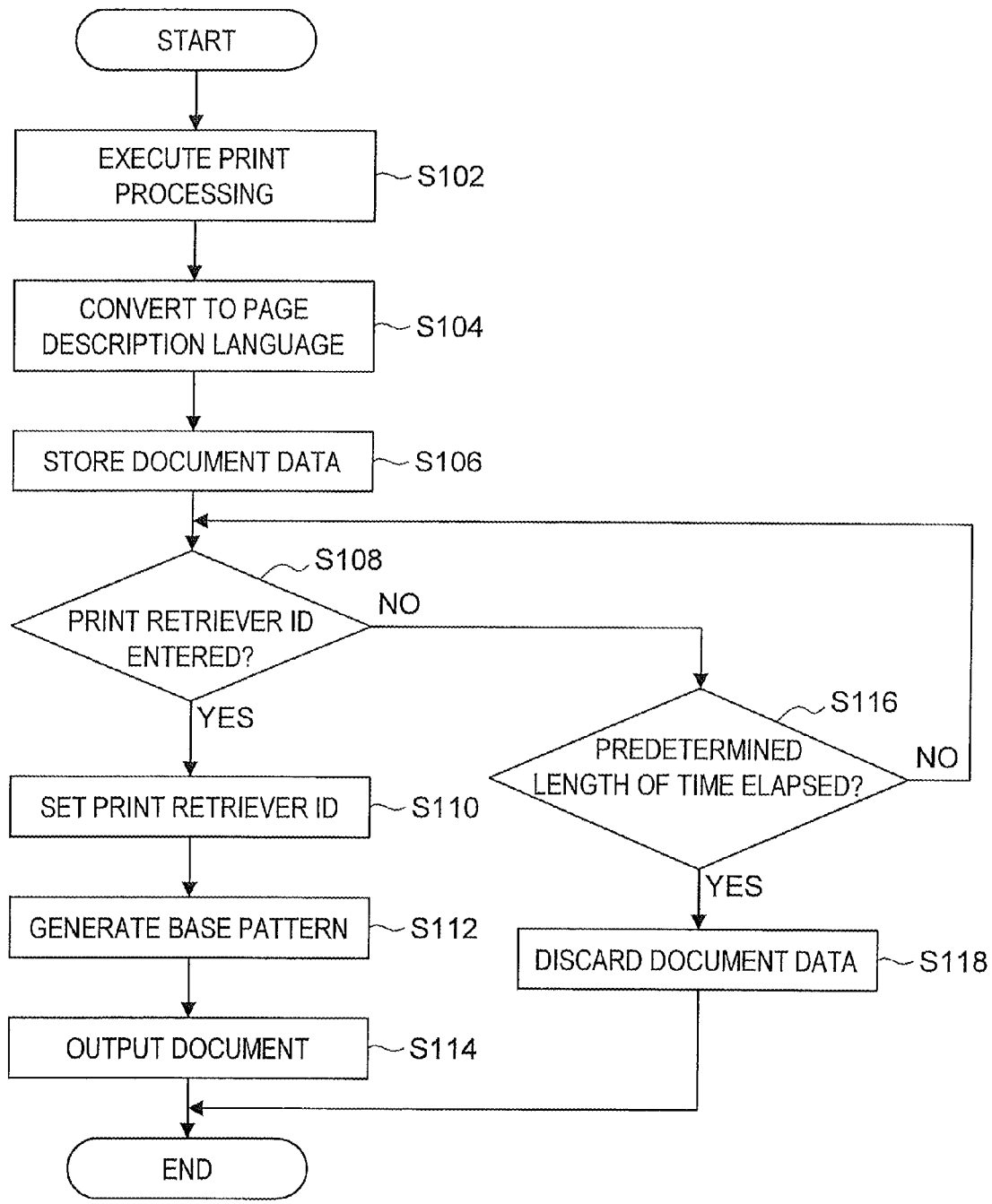
FIG. 3 presents a flowchart of the processing executed in the first embodiment of the present invention.

FIG. 3 presents a flowchart of the print processing executed in the first embodiment of the present invention.

First, the printing instruction issuer executes original document print processing from the printing instruction issuing terminal 110 (step S102). The print processing may be executed by using the printing function of the word processing software program or the editor program operated at the printing instruction issuing terminal 110.

As the original document print processing is executed at the printing instruction issuing terminal 110, the page description language conversion means 112 converts the original document into data written in a page description language that can be read by the printing device 120 and the electronic document data 150 resulting from the conversion are transmitted to the printing device 120 (step S104).

The electronic document data 150 thus transmitted are temporarily stored into the document storage means 122 at the printing device 120 (step S106).

Once the electronic document data 150 are stored into the document storage means 122, the printing device 120 waits in standby over a predetermined length of time for the print retriever ID to be set via the ID setting means 130 (step S108).

If the print retriever ID is entered through the ID setting means 130 within the predetermined length of time, the print retriever ID is set (step S110), and the base pattern generation means 126 executes processing for superimposing the print retriever ID having been set over the electronic document data 150 as a base pattern (step S112). If the electronic document data 150 having been transmitted from the printing instruction issuing terminal 110 include information indicating specific printing conditions such as the document title assigned to the electronic document data 150, the name of the printing instruction issuer, the name of the printing instruction issuing terminal or the IP address of the printing instruction issuing terminal, information indicating at least one of the printing conditions may be superimposed as the base pattern in step S112. In addition, information that enables identification of the printing device 120, such as the serial number assigned to the printing device 120 or the printing device ID pre-assigned to the printing device 120, may instead be superimposed as the base pattern constituting the watermark information.

The electronic document data 150 having superimposed thereupon the base pattern are then output onto paper via the printing means 128 (step S114). Once the electronic document data 150 are output onto the paper, the print processing ends.

If, on the other hand, no print retriever ID is set in step S108, a decision is made as to whether or not the predetermined length of time has elapsed (step S116). If it is decided that the predetermined length of time has not elapsed, the operation returns to step S108 to wait in standby for the print retriever ID to be set via the ID setting means 130. If no print retriever ID is set via the ID setting means 130 after the predetermined length of time elapses, the electronic document data 150 are discarded (step S118) and the processing ends. The electronic document data 150 are discarded in step S118 as described above so as to better protect the confidentiality of the electronic document data 150. However, the electronic document data 150 may remain stored at the document storage means 122 when the predetermined length of time elapses, instead of being discarded.

As described above, the first embodiment of the present invention provides a printing device and a printing method that make it possible to identify the party who has actually output the printed matter from the printing device by superimposing on the output document information indicating the party who has retrieved the printed matter from the printing device.

Second Embodiment

Figure 4:
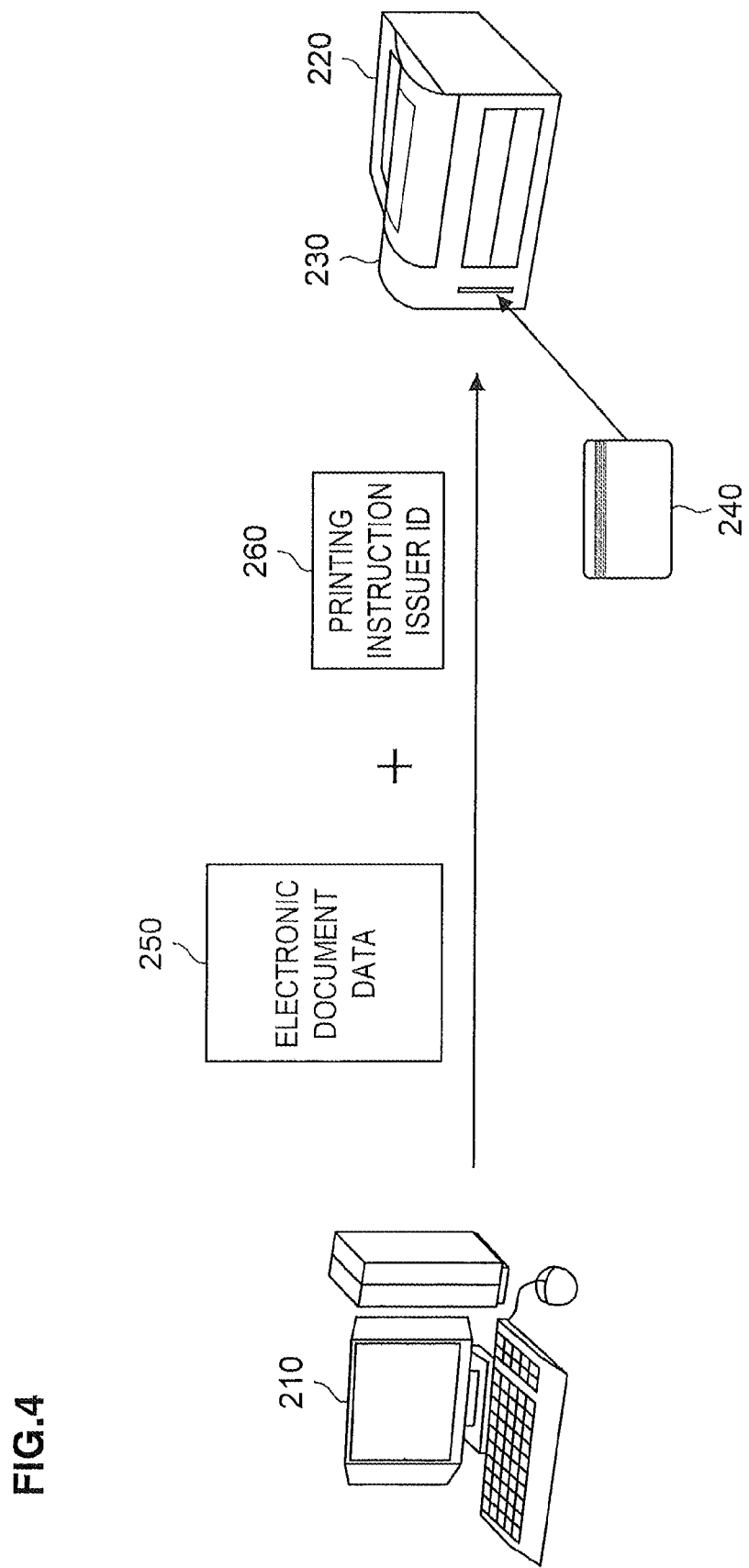
FIG. 4 shows the structure adopted in the second embodiment of the present invention.
Figure 5:
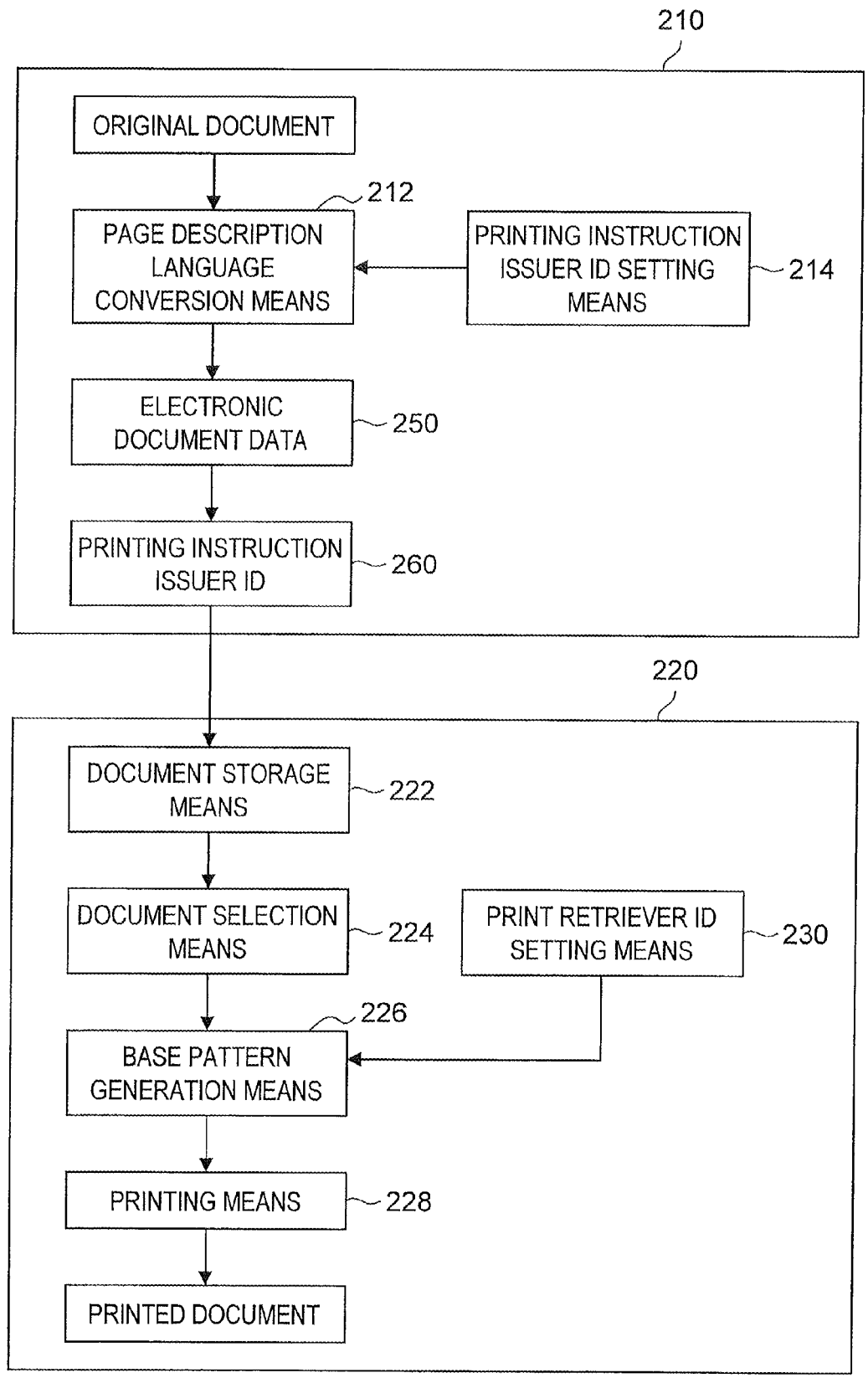
FIG. 5 is a block diagram of the second embodiment of the present invention.

FIGS. 4 and 5 provide diagrams in reference to which the printing device and the printing method achieved in the second embodiment of the present invention are explained. As shown in FIGS. 4 and 5, the printing method in the second embodiment of the present invention is also implemented in conjunction with a printing instruction issuing terminal 210 and a printing device 220, as in the case of the printing method in the first embodiment The printing instruction issuing terminal 210 includes a page description language conversion means 212 and a printing instruction issuer ID setting means 214.

The page description language conversion means 212, which converts an original document to data written in a page description language that can be read by the printing device, is normally realized in the form of a software program such as a printer driver, as is the page description language means in the first embodiment. While the existing page description languages include PostScript and HP-PCL, either of these page description languages may be used in the embodiment.

The printing instruction issuer ID setting means 214 sets a printing instruction issuer ID 260 which is used as information for identifying the printing instruction issuer. The log-in user at the printing instruction issuing terminal may be set as the printing instruction issuer ID 260. Alternatively, the printing instruction issuer ID may be set by using a card reader connected to the printing instruction issuing terminal 210 to read an ID card owned by the printing instruction issuer or by entering the printing instruction issuer ID 260 through a keyboard together with a printing instruction. In addition, the user entering the printing instruction issuer ID 260 may also be asked to enter a password. The password thus entered may then be transmitted to the printing device together with the electronic document data 250.

The printing device 220 comprises a document storage means 222, a document selection means 224, a base pattern generation means 226 to function as a watermark information superimposing means, a printing means 228 and a print retriever ID setting means 230.

At the document storage means 222, the electronic document data 250 generated at the printing instruction issuing terminal 210 are temporarily stored. The document storage means 222 may be constituted with a hard disk drive or a large-capacity memory. While the document storage means 222 in the embodiment is built into the printing device 220, as in the first embodiment, the document storage means 222 according to the present invention does not need to be provided as a built-in unit in the printing device 220 and may instead be constituted with a hard disk drive or a large-capacity memory provided as an outside unit directly connected to the printing device 220 or connected to the printing device 220 via a network. In other words, the document storage means 222 may assume a mode such as a document server connected to the printing device 220.

The print retriever ID setting means 230 sets a print retriever ID indicating a print retriever to retrieve the electronic document data from the printing device 220 as printed matter containing the electronic document data printed out on paper. The print retriever ID is set in this embodiment by entering information that enables identification of the print retriever. The print retriever ID setting means 230 may be constituted with a numeric keypad provided at the printing device, a card reader capable of reading an ID card of the print retriever, or a biometric verification device that biometrically verifies the print retriever. Either a contact-type card reader or a noncontact-type card reader may be used as the ID setting means. In addition, the print retriever ID setting means 230 may constitute an integrated part of the printing device 220 or it may be an outside unit connected to the printing device 220. The print retriever ID setting means 230 provided as an outside unit may be connected to the printing device 220 either through wired connection or wireless connection. The print retriever ID setting means may allow password entry, as well. The print retriever ID setting means 230 in the embodiment is constituted with a magnetic card reader provided as an integrated part of the printing device 220, as in the first embodiment. As a magnetic ID card 240 belonging to the print retriever is inserted at the magnetic card reader, the print retriever ID of the print retriever can be set.

The document selection means 224 selects a specific set of electronic document data to be output onto paper as printed matter from sets of electronic document data stored at the document storage means 222. The document selection means 224 also makes a decision as to whether or not the print retriever with the print retriever ID having been set via the print retriever ID setting means 230 is authorized to retrieve via the printing device 220 the electronic document data stored at the document storage means 222.

The decision as to whether or not the print retriever has been granted retrieval authorization may be made by judging whether or not the print retriever ID matches the printing instruction issuer ID. Alternatively, an authorized print retriever ID indicating an authorized print retriever allowed to output the electronic document data onto paper via the printing device may be appended to the electronic document data together with the printing instruction issuer ID and the decision as to whether or not the print retriever is authorized to retrieve the print may be made by judging whether or not the print retriever ID matches either the printing instruction issuer ID or the authorized print retriever ID.

Alternatively, information indicating an attribute of the print retriever who is allowed to retrieve the electronic document data as printed matter may be appended to the electronic document data together with the printing instruction issuer ID and the decision as to whether or not the print retriever has the retrieval authorization may be made by judging whether or not the attributes of the print retriever corresponding to the print retriever ID having been set include the print retriever attribute transmitted from the printing instruction issuing terminal. These attributes assume a hierarchical structure, and a higher-order attribute includes lower-order attributes. For instance, assuming that an attribute "section manager" is set in correspondence to the printing instruction issuer and that an attribute "department manager" is set in correspondence to the print retriever, the print retriever with the higher-order attribute is authorized to retrieve the corresponding electronic document data. If, on the other hand, the attribute "department manager" is set for the printing instruction issuer and the attribute "section manager" is set for the print retriever, the print retriever with the lower-order attribute is not authorized to retrieve the corresponding electronic document data.

If a password having been entered at the printing instruction issuing terminal is transmitted together with the electronic document data from the printing instruction issuing terminal so as to allow the password to be set at the print retriever ID setting means 230, the document selection means 224 may make a decision as to whether or not the print retriever has output authorization by judging whether or not the password having been set by the printing instruction issuer matches the password set by the print retriever.

The base pattern generation means 226 generates a base pattern based upon information indicating the print retriever ID set via the print retriever ID setting means 230, the printing time or the like and superimposes the base pattern as watermark information onto the electronic document data 250. The data superimposed as the watermark information may include information indicating the printing conditions, such as the document title of the electronic document data, the name of the printing instruction issuer, the name of the printing instruction issuing terminal or the IP address of the printing instruction issuing terminal, in addition to the information indicating the print retriever ID or the printing time. In addition, information that enables identification of the printing device 220, e.g., the serial number assigned to the printing device 220 or an ID pre-designated to the printing device 220, may be superimposed as the watermark information. While the base pattern generation means 226 in this embodiment, too, is provided as a built-in unit in the printing device 220 as in the first embodiment, the base pattern generation means 226 may instead be provided as an outside unit directly connected to the printing device 220 or connected to the printing device 220 via a network.

The watermark information may be superimposed over the electronic document data by adopting the technology disclosed in Japanese Laid Open Patent Publication No. 2003-101762 whereby a base pattern is generated and is superimposed over electronic document data or a two-dimensional barcode technology, as in the first embodiment. However, since a two-dimensional barcode can easily be removed by cutting it off from the printed matter on which it is printed or by painting over it, it is more desirable to adopt the method disclosed in Japanese Laid Open Patent Publication No. 2003-101762 whereby the watermark information is superimposed on the electronic document data by generating a base pattern, i.e., by using the so-called Val-Code (registered trademark) so as to effectively prevent information leaks. Since the base pattern generation method adopted in the embodiment is identical to that adopted in the first embodiment, its explanation is omitted.

The printing means 228 outputs the electronic document data 250 having superimposed thereupon the base pattern to be used as the watermark information, which has been generated at the base pattern generation means 226, as printed matter onto paper. The electronic document data may be printed out onto the paper in a single color or in multiple colors.

Figure 6:
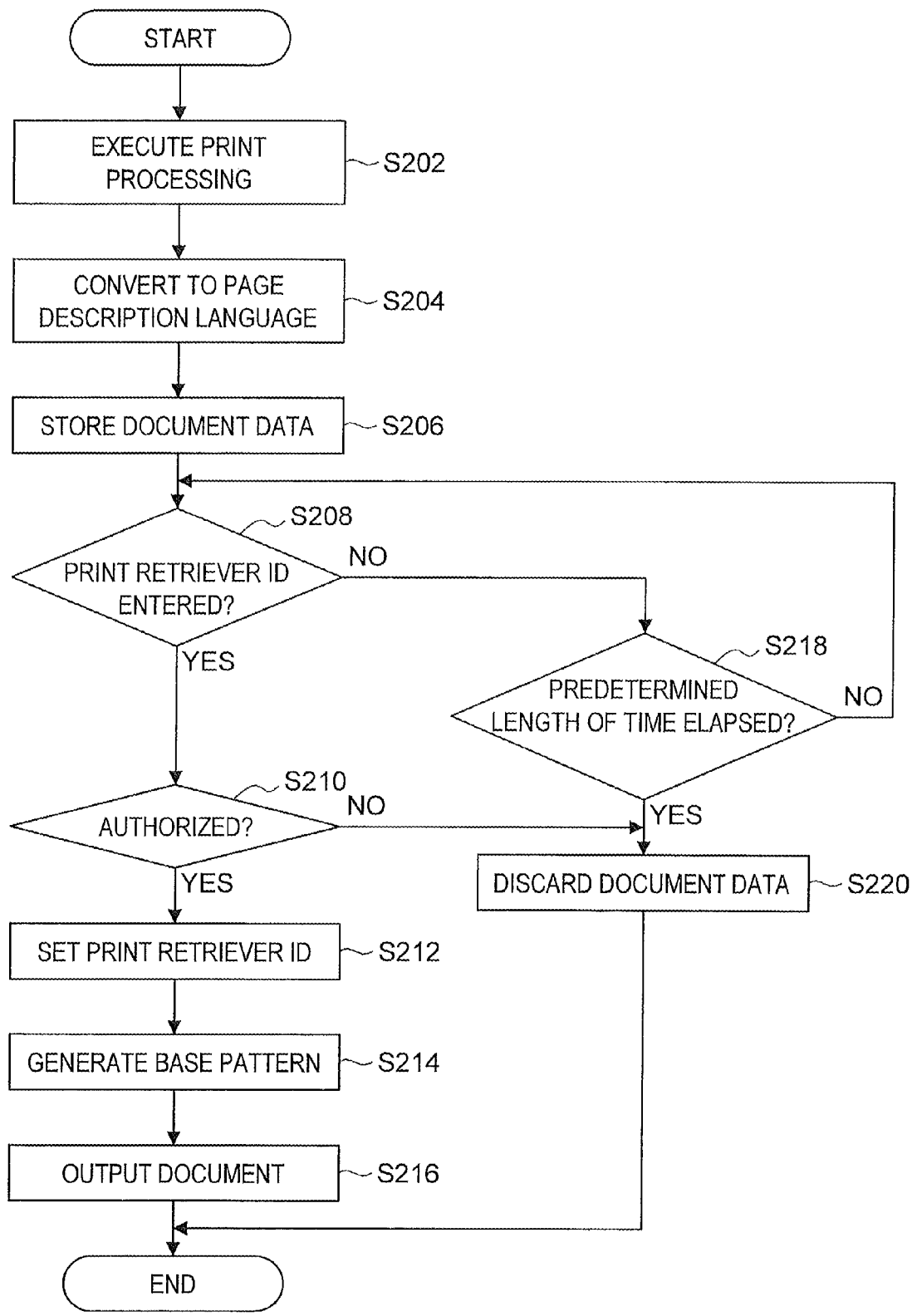
FIG. 6 presents a flowchart of the processing executed in the second embodiment of the present invention.

FIG. 6 presents a flowchart of the processing executed in the second embodiment of the present invention.

First, the printing instruction issuer executes original document print processing from the printing instruction issuing terminal 210 (step S202). The print processing may be executed by using the printing function of the word processing software program or the editor program operated at the printing instruction issuing terminal 210.

As the original document print processing is executed at the printing instruction issuing terminal 210, the page description language conversion means 212 converts the original document into data written in a page description language that can be read by the printing device 220 and the electronic document data at 250 resulting from the conversion are transmitted to the printing device 220 (step S204). When the electronic document data are transmitted, the printing instruction issuer ID having been set at the printing instruction issuer ID setting means 214 is appended to the electronic document data 250 transmitted to the printing device 220.

The electronic document data 250 thus transmitted are temporarily stored into the document storage means 222 at the printing device 220 (step S206).

Once the electronic document data 250 are stored into the document storage means 222, the printing device 220 waits in standby over a predetermined length of time for the print retriever ID to be set via the print retriever ID setting means 230 (step S208).

If the print retriever ID is entered through the print retriever ID setting means 230 within the predetermined length of time, the document selection means 224 makes a decision as to whether or not the person corresponding to the print retriever ID is authorized to retrieve the electronic document data 250 (step S210).

If the person corresponding to the print retriever ID having been set is authorized to retrieve the electronic document data 250, the document retriever ID is set (step S212), and the base pattern generation means 226 executes processing for superimposing the print retriever ID having been set over the electronic document data 250 as a base pattern (step S214). If the electronic document data 250 having been transmitted from the printing instruction issuing terminal 210 include information indicating specific printing conditions such as the document title assigned to the electronic document data, the name of the printing instruction issuer, the name of the printing instruction issuing terminal or the IP address of the printing instruction issuing terminal, information indicating at least one of the printing conditions may be superimposed as the base pattern. In addition, information that enables identification of the printing device 220, such as the serial number assigned to the printing device 220 or the printing device ID pre-assigned to the printing device 220, may be superimposed as the watermark information.

The electronic document data 250 having superimposed thereupon the base pattern are then output onto paper via the printing means 228 (step S216). Once the electronic document data 250 are output onto the paper, the print processing ends.

If, on the other hand, no print retriever ID is set in step S208, a decision is made as to whether or not the predetermined length of time has elapsed (step S218). If it is decided that the predetermined length of time has not elapsed, the operation returns to step S208 to wait in standby for the print retriever ID to be set. If no print retriever ID is set after the predetermined length of time elapses, the electronic document data are discarded (step S220) and the processing ends.

If it is decided in step as 210 that the person corresponding to the print retriever ID having been set is not authorized for electronic document data retrieval, the electronic document data are discarded (steps S 220) to assure a higher level of security and the processing then ends.

The electronic document data 250 are discarded in step S220 so as to enhance the protection for the confidentiality of the electronic document data 250. However, even when the predetermined length of time elapses or even when the person corresponding to the print retriever ID having been set is not authorized to retrieve the electronic document data, the electronic document data 250 do not need to be discarded and they may remain stored at the document storage means 222.

As explained above, the second embodiment of the present invention provides a printing device and a printing method that allow only a party authorized to output electronic document data to retrieve the printed matter. In addition, the information indicating the print retriever ID of the party who has retrieved the printed matter, superimposed on the output printed matter, works as an effective deterrent to information leaks via the printed matter.

While the invention has been particularly shown and described with respect to preferred embodiments thereof by referring to the attached drawings, the present invention is not limited to these examples and it will be understood by those skilled in the art that various changes in form and detail may be made therein without departing from the spirit, scope and teaching of the invention.

The present invention may be adopted in a printing device and printing method with which an electronic document having superimposed thereupon watermark information is printed.

What is claimed is:

1. A printing device that prints out electronic document data having superimposed thereupon watermark information, wherein:
   the printing device is configured to receive electronic document data, which were generated at a data transmission instruction issuer terminal operated by a data transmission instruction issuer who has issued an instruction for transmitting an electronic document, and to receive a data transmission instruction issuer information to identify the data transmission instruction issuer, from the data transmission instruction issuer terminal, the printing device further comprising:
   a document storage unit for storing the electronic document data;
   an operating unit at the printing device for accepting specific information of a print retriever based on a user operation;
   a watermark information superimposing unit for generating a watermark including the data transmission instruction issuer information and the specific information of the print retriever having been accepted at the operating unit and superimposing the watermark onto the electronic document data stored at the document storage unit; and
   a printing unit for outputting the electronic document data having the watermark superimposed thereupon by the watermark information superimposing unit onto paper as printed matter, wherein:
   if the specific information of the print retriever is not accepted within a predetermined length of time via the operating unit, the electronic document data stored at the document storage means are discarded; and
   the watermark information superimposing unit superimposes watermark information indicating the data transmission instruction issuer information and the specific information of the print retriever over the electronic document data only after a decision unit makes a decision that a person corresponding to the specific information is authorized to output the electronic document data onto paper as printed matter.

2. A printing device according to claim 1, wherein:
   the operating unit waits in standby without accepting the specific information of the print retriever until after the electronic document data are transmitted from the data transmission instruction issuing terminal and the electronic document data are stored into the document storage unit.

3. A printing device according to claim 2, wherein:
   information indicating a hierarchical attribute of the data transmission instruction issuer is appended to the electronic document data together with the data transmission instruction issuer information, and the print retriever is only authorized to retrieve the electronic document data if the print retriever has a hierarchical attribute of at least equal order to the hierarchical attribute of the data transmission instruction issuer.

4. A printing device according to claim 2, wherein:
   the operating unit comprises a card reader.

5. A printing device according to claim 2, wherein:
   the operating unit comprises a device that executes biometric verification.

6. A printing method to be adopted in a printing device, comprising steps for:
   generating electronic document data at a data transmitting instruction issuing terminal operated by a data transmitting instruction issuer who has issued an instruction for transmitting an electronic document, the electronic document data containing a data transmitting instruction issuer information:
   storing the electronic document data;
   accepting at the printing device, which is remote from the data transmitting instruction issuing terminal, specific information of a print retriever to retrieve the electronic document data from the printing device, based on a user operation;
   generating a watermark including the data transmitting instruction issuer information and the specific information of the print retriever having been accepted at the printing device;
   superimposing the watermark indicating the print instruction issuer information and the specific information of the print retriever onto the electronic document data at the printing device only after making a decision that a person corresponding to the specific information is authorized to output the electronic document data onto paper as printed matter; and outputting the electronic document data having superimposed thereupon the watermark onto paper as printed matter at the printing device, wherein:
if the specific information of the print retriever is not accepted at the printing device within a predetermined length of time, the stored electronic document data are discarded.

7. A printing method to be adopted in a printing device according to claim 6, wherein:
information indicating a hierarchical attribute of the data transmission instruction issuer is appended to the electronic document data together with the data transmission instruction issuer information, and the print retriever is only authorized to retrieve the electronic document data if the print retriever has a hierarchical attribute of at least equal order to the hierarchical attribute of the data transmission instruction issuer.

8. A printing method to be adopted in a printing device according to claim 6, wherein:
the step of accepting is performed by a card reader.

9. A printing method to be adopted in a printing device according to claim 6, wherein:
the step of accepting is performed by a device that executes biometric verification.

10. A printing device that prints out electronic document data having superimposed thereupon watermark information, wherein:
the printing device is configured to receive electronic document data, which were generated at a data transmission instruction issuer terminal operated by a data transmission instruction issuer who has issued an instruction for transmitting an electronic document, and to receive a data transmission instruction issuer information to identify the data transmission instruction issuer, from the data transmission instruction issuer terminal, the printing device further comprising:
a document storage unit for storing the electronic document data;
an operating unit at the printing device for accepting specific information of a print retriever based on a user operation;
a watermark information superimposing unit for generating a watermark including the data transmission instruction issuer information and the specific information of the print retriever having been accepted at the operating unit and superimposing the watermark onto the electronic document data stored at the document storage unit; and
a printing unit for outputting the electronic document data having the watermark superimposed thereupon by the watermark information superimposing unit onto paper as printed matter, wherein:
the watermark information superimposing unit superimposes watermark information indicating the data transmission instruction issuer information and the specific information of the print retriever over the electronic document data only after a decision unit makes a decision that a person corresponding to the specific information is authorized to output the electronic document data onto paper as printed matter.

11. A printing device according to claim 10, wherein:
the operating unit waits in standby without accepting the specific information of the print retriever until after the electronic document data are transmitted from the data transmission instruction issuing terminal and the electronic document data are stored into the document storage unit.

12. A printing device according to claim 11, wherein:
if the specific information of the print retriever is not accepted within a predetermined length of time via the operating unit, the electronic document data stored at the document storage means are discarded.

13. A printing device according to claim 11, wherein:
information indicating a hierarchical attribute of the data transmission instruction issuer is appended to the electronic document data together with the data transmission instruction issuer information, and the print retriever is only authorized to retrieve the electronic document data if the print retriever has a hierarchical attribute of at least equal order to the hierarchical attribute of the data transmission instruction issuer.

14. A printing device according to claim 11, wherein:
the operating unit comprises a card reader.

15. A printing device according to claim 11, wherein:
the operating unit comprises a device that executes biometric verification.

* * * * *